(12) United States Patent
Heibel et al.

(10) Patent No.: US 9,317,894 B2
(45) Date of Patent: Apr. 19, 2016

(54) METHOD FOR IMAGE REGISTRATION

(71) Applicant: microDimensions GmbH, Munich (DE)

(72) Inventors: Hauke Heibel, Munich (DE); Martin Groher, Munich (DE); Marco Feuerstein, Munich (DE)

(73) Assignee: microDimensions GmbH, Munich (DE)

( * ) Notice: Subject to any disclaimer, the term of this patent is extended or adjusted under 35 U.S.C. 154(b) by 21 days.

(21) Appl. No.: 14/327,680

(22) Filed: Jul. 10, 2014

(65) Prior Publication Data

US 2015/0016703 A1 Jan. 15, 2015

(30) Foreign Application Priority Data

Jul. 10, 2013 (DE) .................... 10 2013 107 301

(51) Int. Cl.
*G06K 9/00* (2006.01)
*G06T 3/00* (2006.01)
*G06T 7/00* (2006.01)

(52) U.S. Cl.
CPC ............ G06T 3/0068 (2013.01); G06K 9/0014 (2013.01); G06T 7/003 (2013.01); *G06T 2207/20016* (2013.01); *G06T 2207/30024* (2013.01)

(58) Field of Classification Search
None
See application file for complete search history.

(56) References Cited

U.S. PATENT DOCUMENTS

2013/0089249 A1\* 4/2013 Mueller et al. ................. 382/128
2013/0156279 A1\* 6/2013 Schoenmeyer et al. ........ 382/128
2013/0223763 A1\* 8/2013 Lin et al. ........................ 382/294

OTHER PUBLICATIONS

Strzodka et al., Fast Image Registration in DIRECTX9Graphics Hardware, Journal of Medical Informatics & Technologies, vol. 6/2003, ISSN 1642-6037, 8 pages.
Official Substantive Communication for Germany Application No. 102013107301.8.

\* cited by examiner

*Primary Examiner* — Atiba O Fitzpatrick
(74) *Attorney, Agent, or Firm* — Moser Taboada

(57) ABSTRACT

A method (30) for image registration of sections, in particular for image registration of histological sections, is described. The method comprises reading in (32) of a data set for at least two sections, wherein each of the data sets comprises m images of each section in m resolution levels (11, 12, 13), wherein each image of the resolution levels 1 to m−1 is divided into at least two cells, wherein each image has a different image resolution, wherein the image with the highest image resolution is associated with the resolution level 1 and the image with the lowest image resolution is associated with the resolution level m; registering (33) of the two mth images of the two sections on the resolution level m and determining of a global transformation for the resolution level m; aligning (34) of the two images of the resolution level m−1 using the global transformation of the resolution level m; and registering (35) of a subgroup of cells from all cells of the two images of the resolution level m−1.

11 Claims, 5 Drawing Sheets

METHOD FOR IMAGE REGISTRATION

RELATED APPLICATIONS

This application claims priority to Germany Application Serial Number 102013107301.8, filed Jul. 10, 2013, which is herein incorporated by reference.

BACKGROUND

1. Technical Field

A method for image registration of sections, in particular for image registration of histological sections.

2. Prior Art

Image registration is used in digital image processing in order to spatially coordinate two or more images, for example images of histological sections. The images to be registered differ from each other since they were recorded as different procedures, from different positions, from different locations (e.g., inside a tissue sample), at different times, with different lenses or in a different resolution.

In some instances large data sets must be used. For example, a single histological section can easily require more than one gigabyte of storage space. If a plurality of histological sections is involved in an image registration the limits of the storage capacity available today can be rapidly exceeded. The processing of such large data sets for an image registration also requires a large amount of time, that is frequently undesired or disadvantageous.

DISCLOSURE OF THE INVENTION

The invention has the object of at least partially solving the above-cited problems, for example, with the goal of reducing the storage capacity necessary for an image registration or of minimizing the time required for the image registration.

To this end, according to embodiments of the invention, a method for the image registration of sections, in particular for the image registration of histological sections, is described, in which a resolution-dependent global transformation is successively determined. The method comprises a) a reading in of a data set of at least two sections, wherein each of the data sets comprises m images of each section in m resolution levels, wherein each image of the resolution levels 1 to m−1 is divided into at least two cells, wherein each image has a different image resolution, wherein the image with the highest image resolution is allocated to the resolution level 1 and the image with the lowest image resolution is associated with the resolution level m; b) a registration of the two $m^{th}$ images of the two sections on the resolution level m and determining of a global transformation for the resolution level m; c) an alignment of the two images of the resolution level m−1 using the global transformation of the resolution level m; and d) a registration of a subgroup of cells from all cells of the two images of the resolution level m−1.

The sections used for the image registration are not limited to histological sections but rather comprise all images or layer images that can be obtained from three-dimensional bodies. They are, for example, images from computer tomography (CT), magnetic resonance tomography (MRT), digital volume tomography (DVT) or the like.

A method of typical embodiments first carries out a rough alignment of the two images on a given resolution level with the previously determined global transformation of a level with the next lower resolution. The level m is the level with the lowest resolution and can also be divided into several cells. A registration of only a part of the two images is subsequently carried out. In particular, the entire images are not registered but only a sub-range of the images (i.e. the sub-group of cells), that can be selected for example by a user. This reduces the required storage capacity and the time required for the registration since only sub-ranges of the images are registered and not the entire images.

According to embodiments of the invention, the method furthermore comprises an e) alignment of the two images of the resolution level m−2 using the global transformation of the resolution level m−1; and f) registration of a sub-group of cells from all cells of the two images of the resolution level m−2. The method is therefore typically continued on the next resolution level m−2. The registration takes place in turn only for the sub-ranges of the images thereby, i.e., the sub-group of cells. For example, the registration takes place on the resolution level m−2 for precisely the cells in which the selected image element is contained.

According to embodiments of the invention the method furthermore comprises g) an alignment of the two images of the resolution level m−n using the global transformation of the resolution plate m−n+1; and h) registration of a sub-group of cells from all cells of the two images of the resolution level m−n, wherein n is a whole number from 3 to m−1. The method can therefore be carried out successively starting from a resolution level, for example the resolution level m with the lowest resolution, until reaching a resolution level selected, for example, automatically or by a user. The registration takes place in this case for sub-ranges of the images, i.e., a particular sub-group of cells. According to some embodiments, the registration takes place on each resolution level only for precisely the cells in which the selected image element is contained. In particular, the alignment of the steps c), e) and g) can be designated as an initial or starting alignment.

According to embodiments of the invention the blocks g) and h) are successively repeated for n=3 to n=k, wherein k is a whole number from 4 to m−1, or k is a whole number from 4 to m−1 selected by a user. The user can therefore determine a desired resolution and the method is successively continued only until the resolution level selected by the user has been achieved.

According to embodiments of the invention, the registration of a sub-group of cells comprises constructing a particular local transformation for each cell of the sub-group. Therefore, a specific local transformation is determined for each cell, which makes possible an exact alignment of the particular cells of both images.

According to embodiments of the invention, the particular local transformation of a cell of the sub-group is constructed based on the previously determined global transformation of the next higher resolution level.

According to embodiments of the invention, the method furthermore comprises a validation of at least one of the constructed local transformations for at least one cell of the sub-group. This makes it possible that only suitable local transformations are used. If for example, a defective local transformations is discovered by the validation (validation is, e.g., negative), then it is rejected and no longer used for future registrations. However, if the local transformation is validated as positive the local transformation is stored, for example, for its cell and its resolution level, and can be used in future registrations and/or alignments.

According to embodiments of the invention, the method furthermore comprises updating of the global transformation of at least one of the resolution levels based on at least one on the local transformations constructed for the cells of this level. If local transformations are determined for a given resolution level the accuracy of the global transformation of this resolution level can be increased using them. This has the result, in particular, that the alignment of the resolution level in accordance with the invention can take place more exactly with the next higher resolution before the registration of the sub-group of cells. For example, updating of the global transformation takes place after at least one of the above steps d), f) and h).

According to embodiments of the invention the method furthermore comprises selecting of an image element by a user, or automatically, before the registration of the sub-group of cells. The selection takes place, according to some embodiments, before step a). The user can, for example, select an area of a histological section that he would like to observe more precisely, for example, in order to prepare a medical diagnosis. Furthermore, according to some embodiments, he can also select the desired resolution.

According to embodiments of the invention, the cells of the sub-group are selected in such a manner that the image element is contained in each of the sub-groups and/or wherein the cells of the sub-group contain at least a part of the image element. It is achieved in this manner that only those cells are registered on the resolution levels that contain the image element that is selected, for example, by a user or automatically. The registration process is limited to what is essential, without using unnecessary storage capacity or time.

According to embodiments of the invention a system for registering at least two images is described. The system comprises a processor configured to carry out the above-described method.

SHORT DESCRIPTION OF THE DRAWINGS

Exemplary embodiments of the invention are shown in the figures and are described in detail in the following. In the drawings.

EMBODIMENTS OF THE INVENTION

Figure 1:
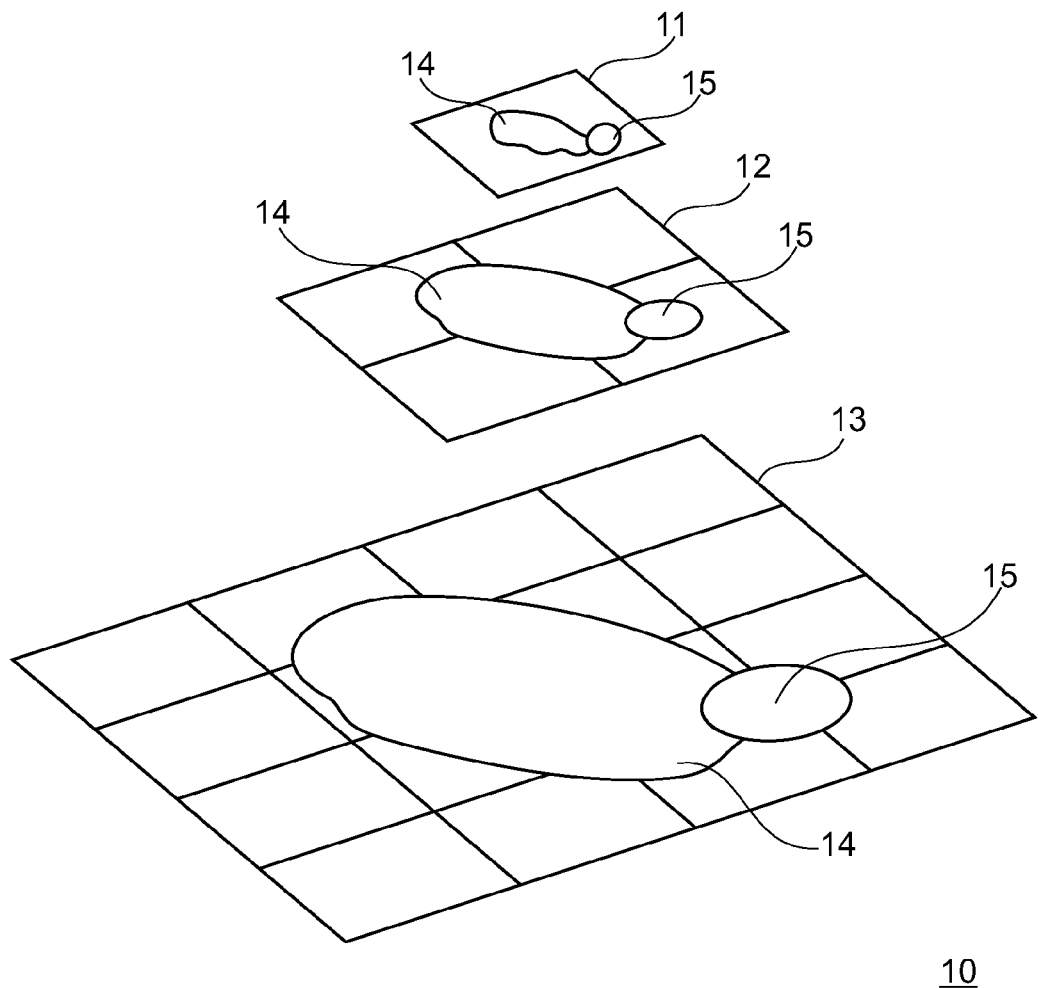
FIG. 1 shows a schematic view of resolution levels according to typical embodiments.

FIG. 1 is a schematic view of a hierarchical grid 10 with a number of m resolution levels according to embodiments described here. m=3 resolution levels are shown and designated with the reference numerals 11, 12 and 13. The number of resolution levels is not limited to three in typical embodiments. Any desired number of resolution levels can be present before or after the resolution levels 11, 12 and 13 shown. The first resolution level 11 has a first resolution, the resolution level 12 has a second resolution that is higher than that of the first resolution level 11 and the resolution level 13 has a resolution that is higher than that of the resolution level 12.

The resolution levels 11, 12 and 13 are divided into cells. According to some embodiments, the resolution level 11 comprises one cell, the resolution level 12 comprises four cells and the resolution level 13 comprises 16 cells.

In the exemplary embodiment shown, each cell of a resolution level has four descendants in the resolution level with the next higher resolution. In other embodiments a number other than four descendants can also be present in the next resolution level. Typically, each resolution level with the next higher resolution comprises at least two descendants per cell.

According to some embodiments, the resolution level 11 with one cell is the resolution level with the lowest resolution. However, other resolution levels can be present that have a lower resolution than the resolution level 11. According to some embodiments, the method can begin in particular with any resolution level.

Each of the resolution levels comprises an image of each section. In FIG. 1 an object contained in the images, for example, an organ or a histological structure, for example, a tumor or a lymph node, is designated with the reference numeral 14. An image element 15 is selected automatically or by a user in advance, before the method for image registration begins, according to some embodiments. Furthermore, according to some embodiments, a desired resolution is also selected automatically, or by a user, in advance.

Figure 2:
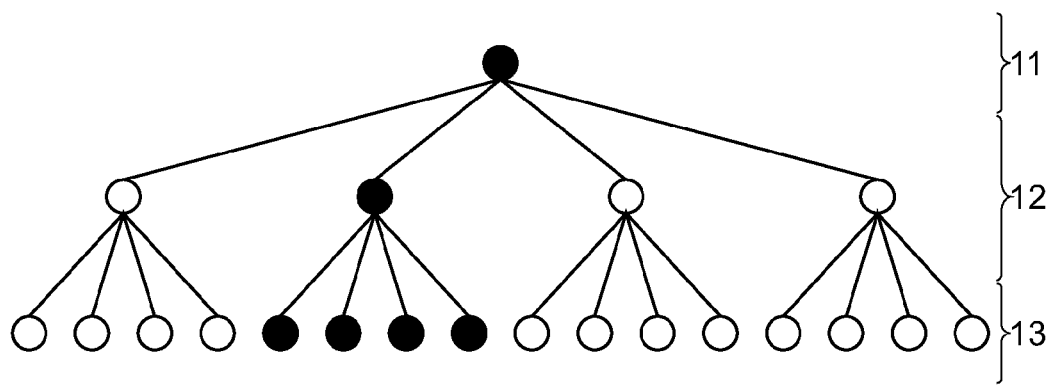
FIG. 2 shows a schematic view of a hierarchy of cells of the resolution levels of FIG. 1 according to typical embodiments.

FIG. 2 is a schematic view of a hierarchy 20 of cells in the resolution levels 11, 12 and 13 of FIG. 1 according to the embodiments described here. As explained above, the resolution level 11 comprises one cell, the resolution level 12 comprises four cells and the resolution level 13 comprises 16 cells. They are represented in the FIG. 2 as circles. Each cell of a resolution level has four descendants here in the resolution level with the next higher resolution. Filled-out circles indicate the cells of each level that contain the image element 15. According to the method for image registration only those cells that contain the image element 15 are also actually registered, that is, all cells that are shown in FIG. 2 as filled-out circles.

Figure 3:
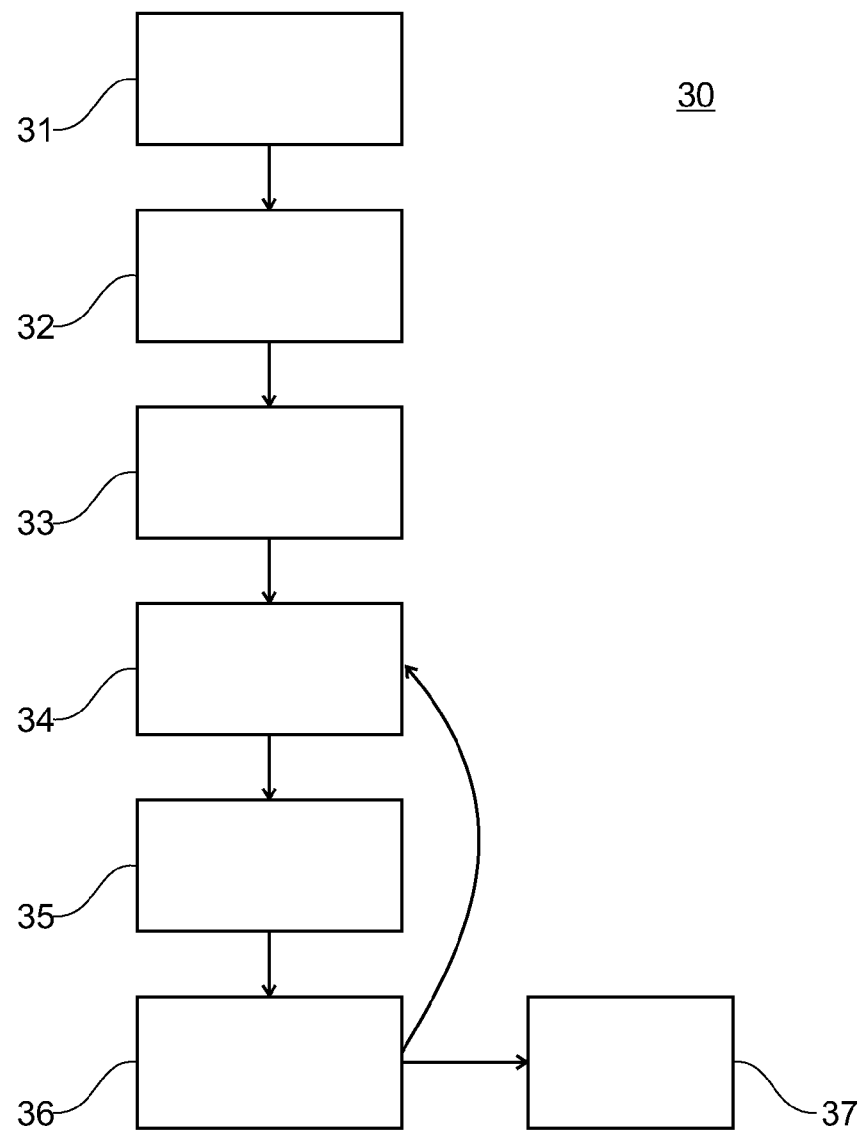
FIG. 3 shows a flowchart of a method for the image registration of sections, in particular for the image registration of histological sections in accordance with typical embodiments.

FIG. 3 is a flow chart of a method 30 for the image registration of sections, in particular for the image registration of histological sections according to embodiments described here. The method begins with block 31 in which, for example, a user selects an image element and sets a target resolution, that is, a resolution in which the image element is to be shown, for example, on a monitor.

A data set of at least two sections is read in block 32, wherein each data set m comprises images of each section in m resolution levels, wherein each image of the resolution levels 1 to m−1 is divided into at least two cells, wherein each of the images has a different image resolution, and wherein the image with the highest image resolution is associated with the resolution level 1 and the image with the lowest image resolution is associated with the resolution level m.

As regards the example of FIGS. 1 and 2, three images are read in for each section, that is, one image of each section for each resolution level 11, 12 and 13. Since the image element is selected in advance, according to some embodiments, only the sub-group of cells of each image that contains the image element is read in. This reduces the time required for the reading in and the processing. Alternatively, according to some embodiments, all cells of an image are read in, wherein then, for example, only the sub-group of cells is used in the further processing (registration of the sub-group of cells, etc.).

In the block 33 the two $m^{th}$ images of the two sections are registered on the resolution level m and a global transformation is determined for the resolution level m. In the example of FIGS. 1 and 2, the two images of the two sections on the resolution level 11 with the lowest resolution are registered and a global transformation for this resolution level 11 is determined.

In the block 34 the two images of the resolution level m−1 are roughly aligned using the global transformation of the resolution level m. In the example of FIGS. 1 and 2, the two images of the two sections on the resolution level 12 with the four cells are roughly aligned with the global transformation of the resolution levels 11. If only the cell with the image element 15 was read in, according to some embodiments only this one is aligned with the global transformation of the resolution level 11. If the entire image, that is, all four cells, were read in, according to some embodiments, the entire image is aligned with the global transformation of the resolution level 11. According to some embodiments, all cells are read in and then only those cells are aligned that contain the image element 15.

In the block 35 a sub-group of cells of all cells in the two images of the resolution level m−1 is registered. In the example of the FIGS. 1 and 2 a sub-group of cells of the resolution level 12 that contains an individual cell is registered in this case, that is, the cell with the image element 15.

According to embodiments of the invention, the registering of the sub-group of cells comprises a setting up of a local transformation for each cell of the sub-group. In particular, according to some embodiments, an individual local transformation is constructed for each cell of the sub-group. According to some embodiments the local transformation is a two-dimensional (2D) transformation and in particular a linear transformation.

According to embodiments of the invention, the local transformation comprises a number of parameters, for example, six parameters, that are to be determined. According to some embodiments, they can be those six parameters that describe the maximal six degrees of freedom of linear 2D transformations: two degrees of freedom in the translation (dx, dy), two degrees of freedom in the scaling (sx, sy), one degree of freedom regarding a rotation in the level (alpha), and one degree of freedom with respect to the shearing (beta).

According to embodiments of the invention, one or more of the six parameters for the image registration of the sub-group of the cells is/are used. In particular, according to some embodiments, any desired selection of the above-cited six parameters is used for the registration. According to some embodiments of the invention, some parameters are set in advance, for example, for fixed magnitudes, or remain unconsidered.

According to some embodiments of the invention, this is, in particular, a function of the recording modalities. If the images of the sections were recorded from the same position with the same device, the parameter regarding a rotation in the level for the equation system that is to be solved can possibly be eliminated.

According to embodiments of the invention, the particular local transformation of a cell of the sub-group is constructed based on the global transformation of the next higher resolution level. According to some embodiments the local transformation of a cell in a resolution level can be obtained with a minimizing function and/or updated after a preceding initialization. According to some embodiments, the minimizing function can describe a dissimilarity of the images or cells transformed with the local transformation.

Figure 4:
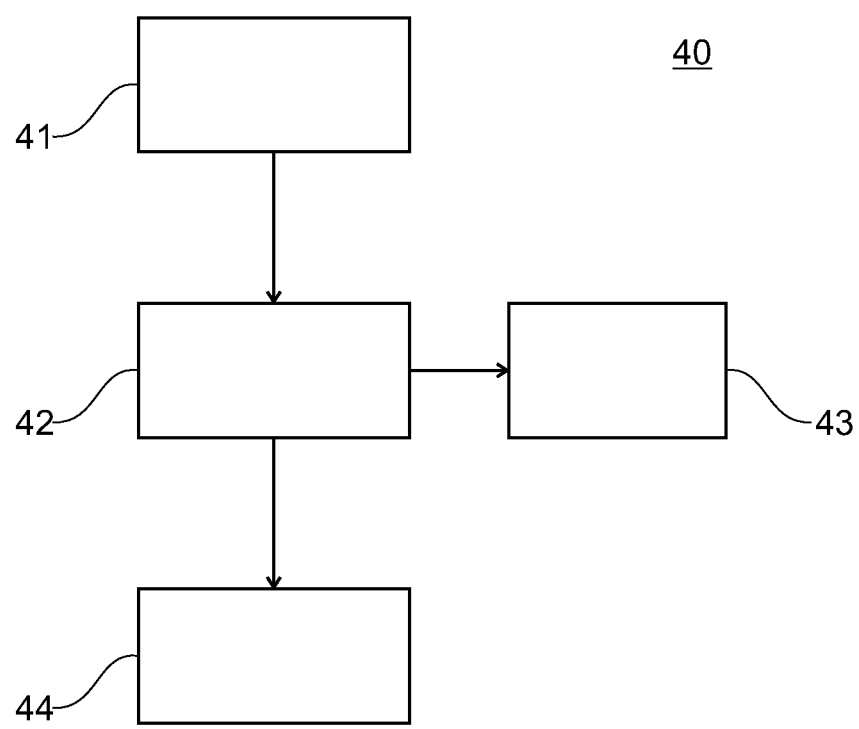
FIG. 4 shows a flowchart of a method for validating a local transformation constructed for a cell of a resolution level in accordance with embodiments described here.

According to embodiments of the invention, at least one of the local transformations of the cell(s) of the sub-group of the resolution level is validated. This method is shown in FIG. 4 and will be described later with reference to FIG. 4.

It is checked in block 36 whether the resolution level selected, according to some embodiments, by the user has been achieved. If this is the case, the method goes to block 37 and is terminated. According to some embodiments, the registration result is then shown in the selected resolution, for example, on a monitor. In particular, according to some embodiments of the invention, only the sub-group of the cells is shown.

If it is determined in block 36 that the resolution level selected, according to some embodiments, by the user has not yet been achieved, the method continues with block 34.

In essence, the above described blocks 34 and 35 are repeated for the next resolution level. In the example of FIGS. 1 and 2, according to some embodiments, the global transformation of the resolution level 12 is used in the block 34 in order to roughly align the two images of the two sections on the resolution level 13 with the 16 cells. If only the 4 cells with the image element 15 were read in, only they are aligned with the global transformation of the resolution level 12. If the entire image, that is, all 16 cells were read in, according to some embodiments, the entire image is aligned with the global transformation of the resolution level 12. According to some embodiments, all cells are read in and then only those cells that contain the image element 15 are aligned.

Subsequently, a sub-group of cells from all cells of the two images of the resolution level 13 are registered in block 35. In the example of FIGS. 1 and 2 a sub-group of cells of the resolution level 13 is registered that, in this case, contains four cells with the image element 15. The registration takes place in such a manner as was already described above for block 35.

A check is made again in block 36 as to whether the resolution level, selected by the user according to some embodiments, has been achieved. If this is the case, the method goes to block 37 and is terminated. According to some embodiments, the registration result is then shown in the selected resolution, for example, on a monitor, after the images with the previously calculated global transformation have been aligned. In particular, according to embodiments of the invention, only the sub-group of the cells is shown.

If it is determined in block 36 that the resolution level selected, according to some embodiments, by the user, has not yet been achieved, the method repeats blocks 34 and 35 for the next resolution level. The steps 34, 35 and 36 are alternately repeated until the resolution level, selected according to some embodiments, by the user, has been achieved. If this is the case, the method finally goes to the block 37 and is terminated. According to some embodiments, the registration result, as already described, is shown, for example, on a monitor in the selected resolution, after the images with the previously calculated global transformation have been aligned. In particular, according to embodiments of the invention, only the sub-group of the cells is shown.

FIG. 4 shows a flowchart of a method for validating a local transformation constructed for a cell of a resolution level according to embodiments described here.

According to some embodiments of the invention, the method of FIG. 4 was carried out directly following block 35 of FIG. 3 for the particular resolution levels on which the particular sub-groups of cells were registered. According to some embodiments of the invention, the method of FIG. 4 is carried out before block 37, after achieving the selected resolution level for one or more of the constructed local transformations.

The method of FIG. 4 begins at block 41 with the registration of the sub-group of cells of the two images on a given resolution level, that is, with the construction of a local transformation for each cell of this sub-group. Block 41 in FIG. 4 corresponds here substantially to block 35 of FIG. 3.

In block 42 the constructed local transformation is validated. This makes it possible that only suitable local transformations are used. If, for example, a defective local transformation is discovered by the validation (validation is, e.g., negative), then it is rejected in block 43 and is no longer used for future registrations. According to some embodiments, block 41 (that is, block 35 of FIG. 3) is repeated, for example, until a valid local transformation has been found. However, if the local transformation is positively validated, then the local transformation is stored, according to some embodiments, for its cell and its resolution level in block 44, and is used, according to some embodiments, in future registrations and/or alignments.

According to embodiments of the invention, the validation comprises a heuristic test, for example, with three heuristic criteria, for which examples are shown in the following.

The first criterion can be based on an analysis of the structure of the two images or of the particular cells of the images. According to some embodiments, an analysis of the structure of the two cells of the images is carried out, for which the local transformation to be validated was constructed. For example, if the structural information contained in the two cells or images drops below a first limit, the local transformation can be validated as negative and be rejected (block 43).

A second criterion can be based in an analysis of the above-described minimizing function. If the dissimilarity, of the transformed cell that the minimizing function describes, exceeds a second limit, the local transformation can be validated as negative and be rejected (block 43).

A third criterion can be based on analysis of at least one parameter of the above-described minimizing function. If one of the parameters exceeds a particular limit, the local transformation can be validated as negative and rejected (block 43). In typical embodiments, the local transformation is validated as negative and rejected in block 43 if one, two or all three criteria indicate this. If a positive validation takes place, then the local transformation for its cell and its resolution level is stored in block 44 and can be used, for example, in future registrations and/or alignments.

Figure 5:
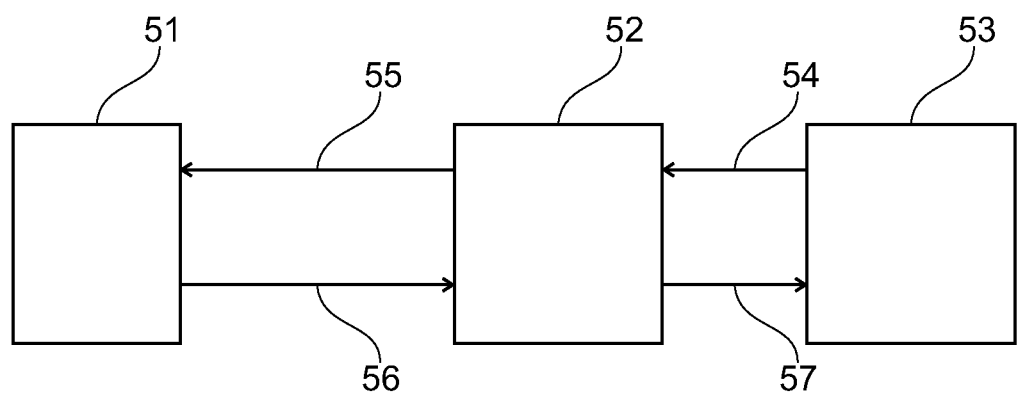
FIG. 5 shows a schematic view of a system for the image registration of sections, in particular for the image registration of histological sections, according to embodiments described here.

FIG. 5 shows a schematic view of a system 50 for the image registration of sections, in particular for the image registration of histological sections according to the embodiments described here. The system is configured to carry out the above-described method.

A user can select, for example, by means of a user interface 53, an image element (designated in the example of FIGS. 1 and 2) and a desired resolution. This inquiry is transmitted to a processor 52. The processor 52 requests a data set of at least two sections of at least one device and reads them in 55, 56.

Referring to the example of FIGS. 1 and 2, three images are read in for each section, that is, one image for each resolution level 11, 12 and 13. Since the image element is selected in advance, according to some embodiments, only the sub-group of cells of each image that contains the image element is read in. This reduces the time needed for the reading in and processing. As an alternative, according to some embodiments, all cells of an image are read in, wherein only the sub-group of cells is then used in the further processing (alignment, registration of the sub-group of cells, etc.).

The processor 52 then carries out the method of the invention for the image registration of sections and shows the registration result, for example, by the user interface (57). According to some embodiments, the registration result is then shown, for example, on a monitor, as already described, in the selected resolution after it has been aligned with the previously calculated global transformation. In particular, according to some embodiments, only the sub-group of the cells is shown.

The invention claimed is:

1. A method for image registration of sections comprising:
   a) reading in data sets of at least two sections, wherein each of the data sets comprises m images of each section at m resolution levels, wherein each image of the resolution levels 1 to m−1 is divided into at least two cells, wherein each image has a different image resolution, wherein the image with the highest image resolution is associated with resolution level 1 and the image with the lowest image resolution is associated with resolution level m;
   b) registering the two $m^{th}$ images of the two sections on the resolution level m and determining a global transformation for the resolution level m;
   c) aligning the two images of the resolution level m−1 using the global transformation of the resolution level m; and
   d) registering a subgroup of cells from all of the cells of the two images of the resolution level m−1,
   wherein the registering of the subgroup of cells comprises constructing a local transformation for each cell of the subgroup,
   wherein the method further comprises an updating of the global transformation of at least one of the resolution levels based on at least one of the local transformations constructed for the cells of the image at this resolution level.

2. The method according to claim 1, further comprising
   e) aligning the two images of the resolution level m−2 using the global transformation of the resolution level m−1; and
   f) registering a sub-group of cells from all of the cells of the two images of the resolution level m−2.

3. The method according to claim 2, further comprising
   g) aligning the two images of the resolution level m−n using the global transformation of the resolution level m−n+1; and
   h) registering a sub-group of cells from all of the cells of the two images of the resolution level m−n, wherein n is a whole number from 3 to m−1.

4. The method according to claim 3, wherein g) and h) are successively repeated for n=3 to n=k, wherein k is a whole number from 4 to m−1, or k is a whole number from 4 to m−1 selected by a user.

5. The method according to claim 1, wherein the particular local transformation of a cell of the sub-group is constructed based on the global transformation of the next higher resolution level.

6. The method according to claim 1, further comprising validating of the constructed local transformation for at least one cell of the sub-group.

7. The method according to claim 1, further comprising selecting an image element by a user, or automatically, before the registration of a sub-group of cells.

8. The method according to claim 7, wherein the cells of the sub-group are selected in such a manner that the image element is contained within each of the sub-groups or wherein the cells of the sub-group contain at least a part of the image element.

9. The method according to claim 1, wherein the sections are histological sections.

10. The method according to claim 1, wherein the subgroup of cells contains less than all of the cells.

11. A system for registering at least two images, comprising a processor configured to carry out a method for image registration of sections:
- a) reading in data sets of at least two sections, wherein each of the data sets comprises m images of each section at m resolution levels, wherein each image of the resolution levels 1 to m−1 is divided into at least two cells, wherein each image has a different image resolution, wherein the image with the highest image resolution is associated with the resolution level 1 and the image with the lowest image resolution is associated with the resolution level m;
- b) registering the two $m^{th}$ images of the two sections on the resolution level m and determining a global transformation for the resolution level m;
- c) aligning the two images of the resolution level m−1 using the global transformation of the resolution level m; and
- d) registering a subgroup of cells from all of the cells of the two images of the resolution level m−1, wherein the subgroup of cells contains less than all of the cells, wherein the registering of the subgroup of cells comprises constructing a local transformation for each cell of the subgroup, wherein the method further comprises an updating of the global transformation of at least one of the resolution levels based on at least one of the local transformations constructed for the cells of the image at this resolution level.

\* \* \* \* \*